United States Patent [19]

Tomoff

[11] Patent Number: 5,005,977

[45] Date of Patent: Apr. 9, 1991

[54] POLARIMETER

[76] Inventor: Toma Tomoff, Lavendelweg 9, 7770 Uberlingen, Fed. Rep. of Germany

[21] Appl. No.: 429,218

[22] Filed: Oct. 30, 1989

Related U.S. Application Data

[63] Continuation-in-part of Ser. No. 400,304, Aug. 29, 1989.

[51] Int. Cl.$^5$ ............................................. G01N 21/21
[52] U.S. Cl. .................................................... 356/367
[58] Field of Search .................................. 356/367, 369

[56] References Cited

U.S. PATENT DOCUMENTS 3,041,921 7/1962 Pickels et al. ...................... 356/368

Primary Examiner—Davis L. Willis
Assistant Examiner—Matthew W. Koren
Attorney, Agent, or Firm—Thomas P. Murphy; Edwin T. Grimes

[57] ABSTRACT

A polarimeter for measuring the rotation of optically active samples comprises a light source which generates a measuring light beam, a polarizer mounted for rotation about the beam axis of the measuring light beam, a driving mechanism for reciprocating rotational movement of the polarizer, a sample vessel, an analyzer behind the sample vessel, a photoelectric detector, and balancing means which are controlled by the signal of the photoelectric detector and by which a position can be achieved in which the polarizer and analyzer are arranged substantially crosswise. The balancing means comprises a steeper motor for rotating the polarizer with an adjusting movement superimposed by the reciprocatingly rotational movement by which adjusting movement a quick coarse balancing of the polarizer plane of the measuring light beam relative to a zero position of the analyzer is achieved. Fine measuring means are provided for the fine measuring of the angle between the polarization plane of the analyzer in its zero position and the polarization plane of the coarsely balanced measuring light beam.

9 Claims, 1 Drawing Sheet

POLARIMETER

This application is a continuation-in-part of our pending application Ser. No. 400,304 filed Aug. 29, 1989 entitled "POLARIMETER".

BACKGROUND AND SUMMARY OF THE INVENTION

The invention relates to a polarimeter and method for measuring the rotation of optically active samples Generally, polarimetric analysis is a method of chemical analysis based on the optical activity of the substance to be determined, i.e., a measurement of optical rotation of the substance is used to identify the substance or determine quantity. A polarimeter is an instrument used to determine the rotation of the plane of polarization of plane polarized light when it passes through a substance.

In German patent application 1 159 180 (which is incorporated herein by reference), a polarimeter with a polarizer, an analyzer and a radiation receiver arranged behind the analyzer is disclosed in which an optically active sample is inserted between the polarizer and the analyzer, and the polarizer is caused to make rotary oscillations about the beam axis. The output signal of the radiation receiver is supplied to phase sensitive balancing means which, when the polarization plane rotates, effect a follow-up rotation of the analyzer.

In the prior art polarimeter, the polarizer is connected to a cylindrical, diametrically magnetized permanent magnet. The permanent magnet is surrounded by concave-cylindrical pole surfaces of a electromagnet exited by an A.C. voltage. A radial leaf spring fetters the permanent magnet and the polarizer to its rest position.

In the prior art driving device, the polarizer oscillates sinusoidally with the mains frequency near the resonance of the oscillatory system formed by the polarizer, permanent magnet, and leaf spring. For balancing, the analyzer is rotated by a servomotor depending on the signal of the detector as long as the analyzer is arranged crosswise with the rotated polarization plane of the measuring light beam. The oscillation of the polarizer provides an alternating signal with an oscillation frequency according to which the servomotor can be controlled.

It is necessary to measure the optical rotation of the measuring light beam with a very high degree of precision (millidegree). Therefore, the analyzer has to follow-up the polarization plane of the measuring light beam very sensitively with a large stepping-down ratio. On the other hand, quite large optical rotations, e.g. 90° rotations, can occur and considerable time, relatively speaking, is required until the analyzer with the correspondingly large stepping-down ratio is rotated to the balancing position.

Accordingly, it is an object of the present invention to provide a new and improved polarimeter which attains a high degree of precision in angular measurement with decreased measuring time.

It has been found that the foregoing and related objects are attained in a polarimeter having a light source generating a measuring light beam, a polarizer mounted for rotation about the beam axis of the measuring light beam, a driving mechanism for reciprocatingly rotational movement of the polarizer, a sample vessel, an analyzer behind the sample vessel, a photoelectric detector sensing the measuring light beam, and balancing apparatus controlled by the signal of the photoelectric detector for positioning the polarizer and analyzer substantially crosswise. The balancing apparatus comprises a stepper motor for rotating the polarizer with an adjusting movement superimposed by a reciprocatingly rotational movement. By the adjusting movement, a quick coarse balancing of the polarizer plane of the measuring light beam relative to a zero position of the analyzer is achieved. Fine measuring means are provided for fine measurement of the angle between the polarization plane of the analyzer in its zero position and the polarization plane of the coarsely balanced measuring light beam.

Thus, the polarizer is utilized not only for generating a reciprocatingly rotational movement of the polarization plane but also for a coarse balancing movement by which the polarization plane of the measuring light beam, which becomes effective at the analyzer with consideration of the optical rotation in the sample, is at least approximately moved into a position in which the polarization plane of the substantially stationary analyzer is arranged crosswise. Thereby, the polarizer makes a movement which is composed of a steady adjusting movement and a reciprocating rotational oscillation movement superimposed onto this adjusting movement. Such coarse balancing can be achieved relatively quickly and fine measuring of the angle is accomplished by separate fine measuring means.

The fine measuring means can measure the exact angle by interpolation of the alternating signal for right-hand and left-hand rotation remaining after the coarse balancing. The fine measuring can also be made by a fine balancing in which the analyzer is rotated. Since the analyzer has to be rotated only through a small angle after the coarse balancing, this rotation can be made quite quickly in spite of the required stepping down ratio.

DESCRIPTION OF THE PREFERRED EMBODIMENT

Figure 1:
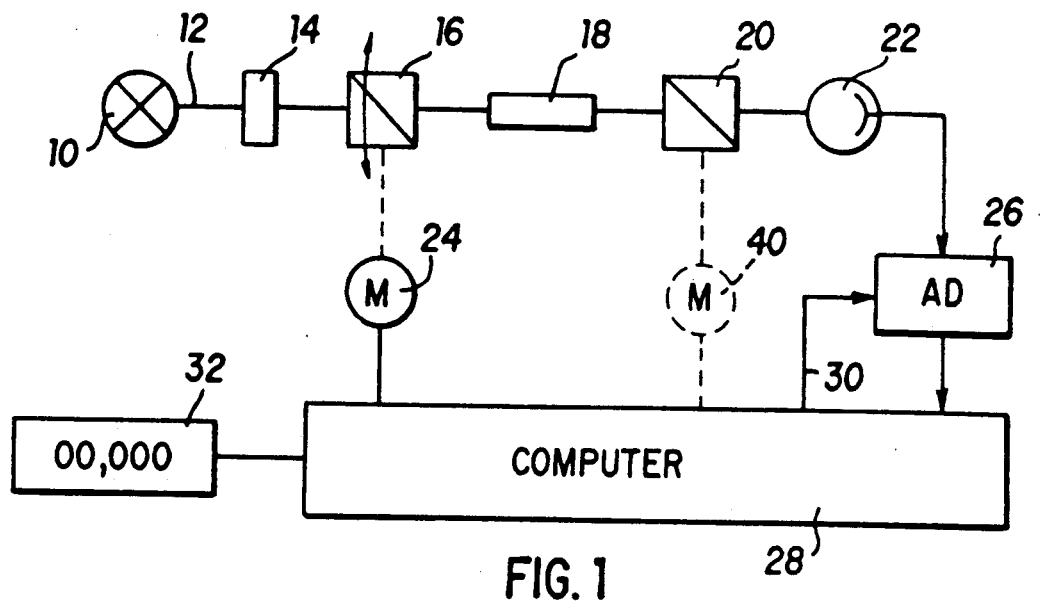
FIG. 1 is a schematical view of a polarimeter of the present invention with coarse balancing by the polarizer, the adjusting movement of which is superimposed by a reciprocating movement.

Although specific forms of the present invention have been selected for illustration in the drawings, and the following description is drawn in specific terms for the purpose of describing these forms of the invention, the description is not intended to limit the scope of the invention which is defined in the appended claims.

Referring to FIG. 1, a measuring light beam 12 originates from a light source 10 and passes through a filter 14, a polarizer 16, a sample vessel 18 and an analyzer 20 and then impinges on a detector 22. The detector 22 is in the form of a photodetector. The vessel 18 contains a sample for measurement of optical rotation.

The polarizer 16 is driven by a stepper motor 24. The driving mechanism for driving the polarizer 16 can be designed as the type described in the commonly owned patent application of the same applicant, German Application No. P 38 30 398.1, filed Sept. 7, 1988 entitled "Driving Mechanism for Driving an Oscillating Polarizer" incorporated herein by reference.

The signal of the detector 22 is supplied to an analog-to-digital converter 26. The analog-to-digital converter 26 provides a digital signal which is supplied to a computer 28 or suitably programmed microprocessor. The analog-to-digital converter is synchronized with the reciprocating movement of the polarizer 16 (described hereinafter) as indicated by line 30. A display apparatus 32 provides a digital angle display for the optical rotation of the polarization plane of the measuring light beam through the sample.

The stepper motor 24 controlled by the computer 28 operates in part as a coarse balancing means for positioning the polarizer 16 and analyzer 20 in a substantially crosswise operational orientation. The stepper motor 24 rotates the polarizer with an adjusting movement superimposed with a reciprocating rotational movement. The adjusting movement provides a quick, coarse balancing of the polarizer plane of the measuring light beam relative to the zero position of the analyzer. Then, fine measuring means (as described hereinafter) provide a fine measuring of the angle between the polarization plane of the analyzer in its zero position and the polarization plane of the coarsely balanced measuring light beam.

Figure 3:
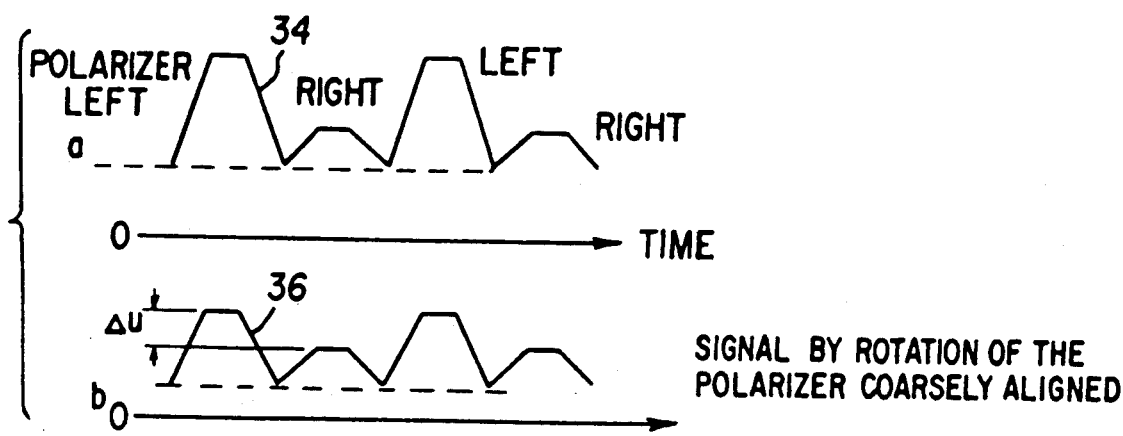
FIG. 3 shows the signals of the detector which occur when the polarizer functions.

More specifically, the polarimeter operates as follows. The stepper motor 24 imparts to the polarizer a reciprocatingly rotational movement in accordance with an approximately trapezoidal waveform. This results in a signal at the detector 22 which corresponds approximately to the graph 34 in the first line of FIG. 3. From this signal, a direct voltage signal for automatic amplification control can be obtained. In addition, two signals result according to the beam intensity being effective at the detector 22 when the polarizer 16 is rotated to the left and to the right. From these two signals, which result from synchronization of the analog-to-digital converter mentioned above, a balancing signal can be gained. By this balancing signal, the stepper motor 24 is additionally controlled through the computer 28 such that it adjusts the polarizer 16 in the sense of balancing. Thereby, the polarizer is adjusted to a position in which the polarization plane of the measuring light beam 12 measured by the polarizer 16 is rotated about the optical rotation of the sample and is arranged substantially perpendicular to the polarization plane of the analyzer 20. This results in a signal 36 at the detector, as it is illustrated in the second line of FIG. 3.

Figure 2:
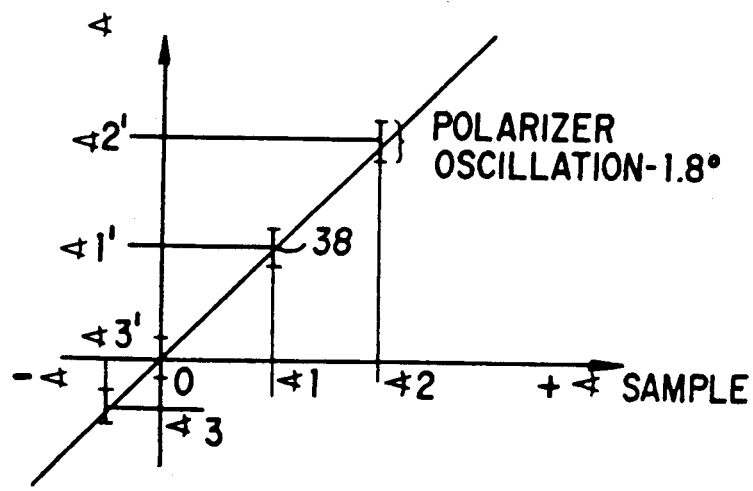
FIG. 2 shows the angle to which the polarizer is adjusted with the oscillating movement superimposed as a function of the optical rotation of the sample.

In FIG. 2, this "coarse balancing" is illustrated schematically. The polarizer 16 is adjusted to an angle with which the rotation of the polarizer 16, relative to the analyzer 20, substantially compensates for just the optical rotation of the sample. The polarizer 16 oscillates about this position, as indicated by the lines 38.

The fine measuring means may comprise electrical interpolation by the computer 28 whereby a fine measuring of the subject angle is achieved from the differences of the signals obtained at the detector 22 when the right-hand and left-hand rotation of the polarizer 16 are superimposed. From the signal 36 obtained near the position of balancing, the amplitude U of which is a measure for the deviation of the polarizer 16 from the position in which the analyzer is arranged crosswise, a fine measuring of the angle can be made.

An alternative configuration is indicted in FIG. 1 with broken line. That is, the analyzer 20 is additionally adjustable by a stepper motor 40 with a large stepping down ratio and therefore the analyzer can be adjusted with a very high degree of sensitivity. After coarse balancing by means of the polarizer 16, a fine balancing by means of the analyzer 20 is effected. Therefore, the signal 36 is used. After the coarse balancing, since the angle between the polarization plane of the measuring light beam at the analyzer 20 is already very small, the fine balancing can be made very quickly in spite of the large stepping down ratio.

As can be seen, the polarimeter and method of the present invention attains a high degree of precision in angular measurement with a decrease in measuring time.

As will be apparent to persons skilled in the art, various modifications and adaptations of the structure above described will become readily apparent without departure from the spirit and scope of the invention, the scope of which is defined in the appended claims.

What is claimed is:

1. A polarimeter for measuring the rotation of optically active samplers comprising
    light source means for generating a measuring light beam along a light path for polarimetric analysis of a sample,
    polarizer means for polarizing said measuring light beam to define a polarization plane for passing through a sample, said light beam having a beam axis and said polarizer means being mounted for rotational movement about said axis,
    sample vessel means for holding sample to be analyzed,
    analyzer means mounted in the light path to receive the measuring light beam from the sample vessel means, said analyzer means having a zero position and defining a polarization plane,
    photodetector means for sensing the measuring light beam from said analyzer means,
    servomotor means for rotating said polarizer means with a first adjusting movement to attain a coarse balancing of the polarization plane of the measuring light beam relative to said zero position of said analyzer means and with a superimposed second reciprocating rotational movement,
    control means for controlling said servomotor means for said adjusting movement and said superimposed reciprocating rotational movement of said polarizer means, said control means being connected to said detector means, and
    means for fine measurement of angle between the polarization plane of said analyzer in said zero position and said polarization plane of the measuring light beam in a coarsely balanced position.

2. The device of claim 1 wherein said servomotor means comprises a stepper motor and said control means comprises a microprocessor means programmed for controlling said stepper motor to provide adjusting movement and superimposed reciprocating rotational movement of said polarizer means.

3. The device of claim 2 wherein
    said analyzer means comprises an analyzer in a fixed angular position relative to said measuring light beam and
    said fine measurement means comprises electrical interpolation means for determining said angle based upon said reciprocating rotational movement of said polarization plane of said measuring light beam sensed by said photodetector means.

4. The device of claim 2 wherein said fine measurement means comprises second servomotor means for rotating said analyzer to finely balance said analyzer means relative to said polarizer means and said microprocessor means including means for controlling said second servomotor means to rotate said analyzer to finely balance said analyzer means relative to said polarizer means after said polarizer is moved to said coarsely balanced position and means for determining said angle.

5. The device of claim 4 wherein said second servomotor means comprises a second stepper motor, said second stepper motor having smaller movement steps than said first stepper motor.

6. The device of claim 1 wherein said analyzer means comprises an analyzer in a fixed angular position relative to said measuring light beam and said fine measurement means comprises electrical interpolation means for determining said angle based upon said reciprocating rotational movement of said polarization plane of said measuring light beam sensed by said photodetector means.

7. A method of measuring the rotation of optically active sample with a polarimeter having a light source generating a measuring light beam, a polarizer defining a polarizing plane, a sample vessel, and an analyzer defining a polarizing plane, comprising the steps of:

moving the polarizer to a coarse balance position where the polarization plane of the measuring light beam is substantially perpendicular to the polarization plane of the analyzer, reciprocatingly rotating the polarizer to generate a reciprocating rotational movement of the polarization plane of the measuring light beam, and measuring the angle between the polarization plane of the analyzer and the polarization plane of the measuring light beam based upon the reciprocating rotation of the polarizer when the polarizer is at the coarse balance position.

8. The method of claim 7 wherein the polarimeter has a fixed analyzer and the step of measuring the angle comprises electrically interpolating said angle based upon the reciprocating rotational movement of the polarization plane of the measuring light beam.

9. The method of claim 7 wherein the polarimeter has a rotatably mounted analyzer and the step of measuring the angle comprises rotating the analyzer to finely balance the analyzer so that the polarization plane of the measuring light beam is perpendicular to the polarization plane of the analyzer.

* * * * *